US008230254B2

(12) United States Patent
Koike

(10) Patent No.: US 8,230,254 B2
(45) Date of Patent: Jul. 24, 2012

(54) REDUNDANT SYSTEM USING OBJECT-ORIENTED PROGRAM AND METHOD FOR RESCUING OBJECT-ORIENTED PROGRAM

(75) Inventor: Tomotake Koike, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 546 days.

(21) Appl. No.: 11/391,387

(22) Filed: Mar. 29, 2006

(65) Prior Publication Data

US 2006/0225035 A1    Oct. 5, 2006

(30) Foreign Application Priority Data

Mar. 31, 2005 (JP) ................ 2005-102347

(51) Int. Cl.
*G06F 11/00* (2006.01)
(52) U.S. Cl. ...... 714/4.12; 709/201; 709/213; 714/6.22; 714/11; 714/12; 714/13; 719/332; 719/328; 370/201; 370/213; 370/352
(58) Field of Classification Search .......... 709/201, 709/213; 714/6, 11, 12, 13; 719/332, 328; 370/201, 213, 352
See application file for complete search history.

(56) References Cited

U.S. PATENT DOCUMENTS

| | | | | |
|---|---|---|---|---|
| 5,095,522 A | * | 3/1992 | Fujita et al. | 719/316 |
| 5,371,891 A | * | 12/1994 | Gray et al. | 717/140 |
| 5,872,973 A | * | 2/1999 | Mitchell et al. | 719/332 |
| 6,240,545 B1 | * | 5/2001 | Carmichael et al. | 717/128 |
| 6,263,379 B1 | * | 7/2001 | Atkinson et al. | 719/332 |
| 6,633,924 B1 | * | 10/2003 | Wu et al. | 719/328 |
| 7,152,179 B1 | * | 12/2006 | Critchfield | 714/4 |
| 2002/0188711 A1 | * | 12/2002 | Meyer et al. | 709/223 |
| 2003/0005350 A1 | * | 1/2003 | Koning et al. | 714/4 |
| 2004/0049765 A1 | * | 3/2004 | Hasha | 717/116 |
| 2006/0072483 A1 | * | 4/2006 | Schwartz | 370/259 |

(Continued)

FOREIGN PATENT DOCUMENTS

JP    06-324859    11/1994

(Continued)

OTHER PUBLICATIONS

Nakanishi et al., "Object-Oriented data handling and OODB operation of LHD mass data acquisistion system" Jul. 30, 199, pp. 1-8.*

(Continued)

*Primary Examiner* — Robert Beausoliel, Jr.
*Assistant Examiner* — Jeison C Arcos
(74) *Attorney, Agent, or Firm* — Rabin & Berdo, P.C.

(57) ABSTRACT

A technology for rescuing an object when a failure occurs in a redundant system. In a synchronization memory, an instance of an object, which includes the virtual function discrimination information for discriminating a memory area where a virtual function corresponding to the object is stored, the class information for discriminating a class corresponding to the object, and the object data to be used for the processing of the object, is stored according to the order of the processing. In a function memory, plural kinds of virtual functions generated for each process to be carried out by the object are stored. When the object of a new active server reproduces the process, the class corresponding to this object is discriminated using the class information, and the virtual function discrimination information of this object is rewritten.

26 Claims, 8 Drawing Sheets

U.S. PATENT DOCUMENTS

2007/0086432 A1* 4/2007 Schneider et al. ............ 370/352
2007/0086439 A1* 4/2007 Schneider et al. ............ 370/352
2008/0205382 A1* 8/2008 Heap ............................ 370/352

FOREIGN PATENT DOCUMENTS

| JP | 10-207849 | 8/1998 |
|----|-----------|--------|
| JP | 2000-163276 | 6/2000 |
| JP | 2001-345850 | 12/2001 |

OTHER PUBLICATIONS

Japanese Office Action with English-language translation dated Aug. 11, 2009, issued in related Japanese Patent Application No. 2005-102347.

* cited by examiner

REDUNDANT SYSTEM USING OBJECT-ORIENTED PROGRAM AND METHOD FOR RESCUING OBJECT-ORIENTED PROGRAM

BACKGROUND OF THE INVENTION

1. Field of the Invention

The present invention relates to a redundant system for executing an object-oriented program and a method for rescuing the object-oriented program, and particularly, the present invention relates to a speeding-up technology and a failure restoration technology of the redundant system. For example, the present invention can be applied to a VoIP-PBX (Voice over Internet Protocol-private branch exchange), namely, a server system having VoIP softswitch installed.

2. Description of Related Art

The redundant system has two or more devices having the same functions and the redundant system uses any one of these devices for a service. One device processing the service is called as an active device and the other one or more devices are called as a standby device. When a failure occurs in the active device, any one of standby devices is changed into the active state. The failure of the device that becomes not active is automatically or manually restored. The device restored from the failure is switched to a standby state to be prepared for occurrence of the failure of the active device.

The redundant system has an advantage that a service interruption time is short when the failure occurs in the device. In addition, the redundant system is expected to continue the service without notifying a user an occurrence of the failure.

In order to take over the processing from the former active device to a new active device, it is necessary to conform the data stored in the memory of the former active device to the data stored in the new active device. A technology to conform the stored data of the new and former active devices to each other is disclosed, for example, in Japanese Patent Application Laid-Open No. 2001-345850. The redundancy system of this document has an information server which performs centralized management of the stored data of the CA (Call Agent), that is each device. The new active device can obtain the stored data of the former active device by reading out the original data from the information server.

As a technology of producing computer software, an object-oriented programming is known. The object-oriented programming is a technology of producing a program by combining the objects. The object is a program unit that is configured by one or a plurality of data and one or a plurality of methods for carrying out the processing by using the data. The method is a code to call a program code group for carrying out the processing. This program code group is called to as a class. For example, the object for displaying a form, namely, a window on a computer screen normally includes the data such as a height of the form, a width of the form, and a name of the form or the like, a method for opening the form, a method for displaying the name on a title bar of the form, and a method for closing the form. The object-oriented program can use the same class for a plurality of objects. As an object-oriented program language, for example, a C++ language is known. The data and the method are stored in a storage device of the computer. When the object-oriented program is carried out, the computer reads out the necessary data and method from the storage device to construct an object on a working memory.

The redundant system of the above-described document cannot rescue the object constructed by using the object-oriented programming. Therefore, in case the technology of the document is applied to the redundant system using the object-oriented program, a new active device needs to reproduce the object.

SUMMARY OF THE INVENTION

An object of the present invention is to provide a technology for rescuing an object when a failure occurs in a redundant system.

A redundant system using an object-oriented program according to the present invention has a plurality of devices comprising: a synchronization memory which stores one or more instances of objects according to the order of the processing, wherein each of instances includes; a virtual function discrimination information which is used for discriminating a memory area where a virtual function corresponding to the object is stored; a class information which is used for discriminating a class corresponding to the object; and an object data which is used for processing the object; a function memory which stores plural kinds of virtual functions generated for each process to be carried out by the object; an application program which reads the instance from the synchronization memory and writes it to a synchronization memory of the other device; and an instance management class which, when a device newly put in the active state reproduces a process of an object, discriminates the class corresponding to the object using the class information, and rewrites the virtual function discrimination information.

A method for rescuing a redundant system using an object-oriented program according to the present invention is that an active device of the redundant system carries out the steps of: storing an instance of an object in a synchronization memory according to the order of the processing, wherein the instance includes; a virtual function discrimination information which is used for discriminating a memory area where a virtual function corresponding to the object is stored; a class information which is used for discriminating a class corresponding to the object; and an object data which is used for processing the object; storing plural kinds of virtual functions generated for each process to be carried out by the object in a function memory; reading the instance from the synchronization memory and writing it to a synchronization memory of a standby device; and discriminating the class corresponding to the object using the class information and rewriting the virtual function discrimination information of this object when the device newly put in the active state reproduces the process of an object.

BRIEF DESCRIPTION OF THE DRAWINGS

The other objects and advantages of the present invention will be described with reference to the following drawings below.

DESCRIPTION OF THE PREFERRED EMBODIMENTS

Figure 1:
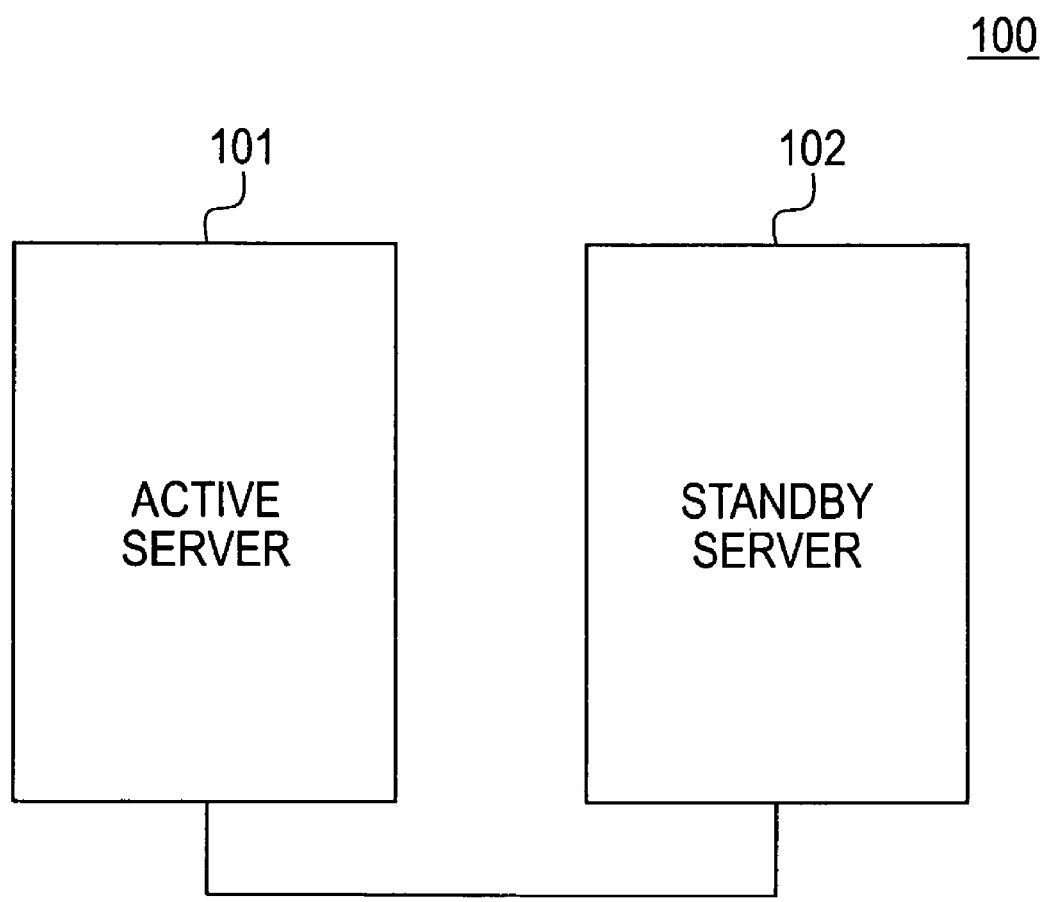
FIG. 1 is a block diagram schematically showing a structure of a redundant server system according to an embodiment of the present invention.

Hereinafter, preferred embodiments of the present invention will be described below with reference to the drawings. In the drawings, the size, the shape, and the arrangement relation of each component are schematically illustrated just enough to understand the present invention and a numerical condition to be described below is merely an example.

The present embodiment will be described taking the case that the present invention is applied to a VoIP-PBX as an example. A redundant server system according to the VoIP-PBX of the present embodiment provides a calling processing service to the user.

FIG. 1 is a block diagram schematically showing a structure of a redundant server system according to the present embodiment. As shown in FIG. 1, a redundant server system 100 of the present embodiment has two servers 101 and 102. The servers 101 and 102 have the same hardware structures and the same software structures. According to the example of FIG. 1, the server 101 is put in the active state, and the server 102 is put in the standby state. As well as the conventional redundant system, the active server 101 performs the calling processing service for the user. When the failure occurs in the server 101, the server 102 is switched to active. The new active server 102 takes over the data and the object from the server 101. In other words, the redundant system according to the present embodiment is different from the redundant system of the prior art in that it can take over the object in addition to the data from the server where the failure occurs in addition to the data. The server 101 is made into the standby state after the failure is restored.

It is also possible to apply the present embodiment to the system having three or more servers. However, the active server is always one piece.

Figure 2:
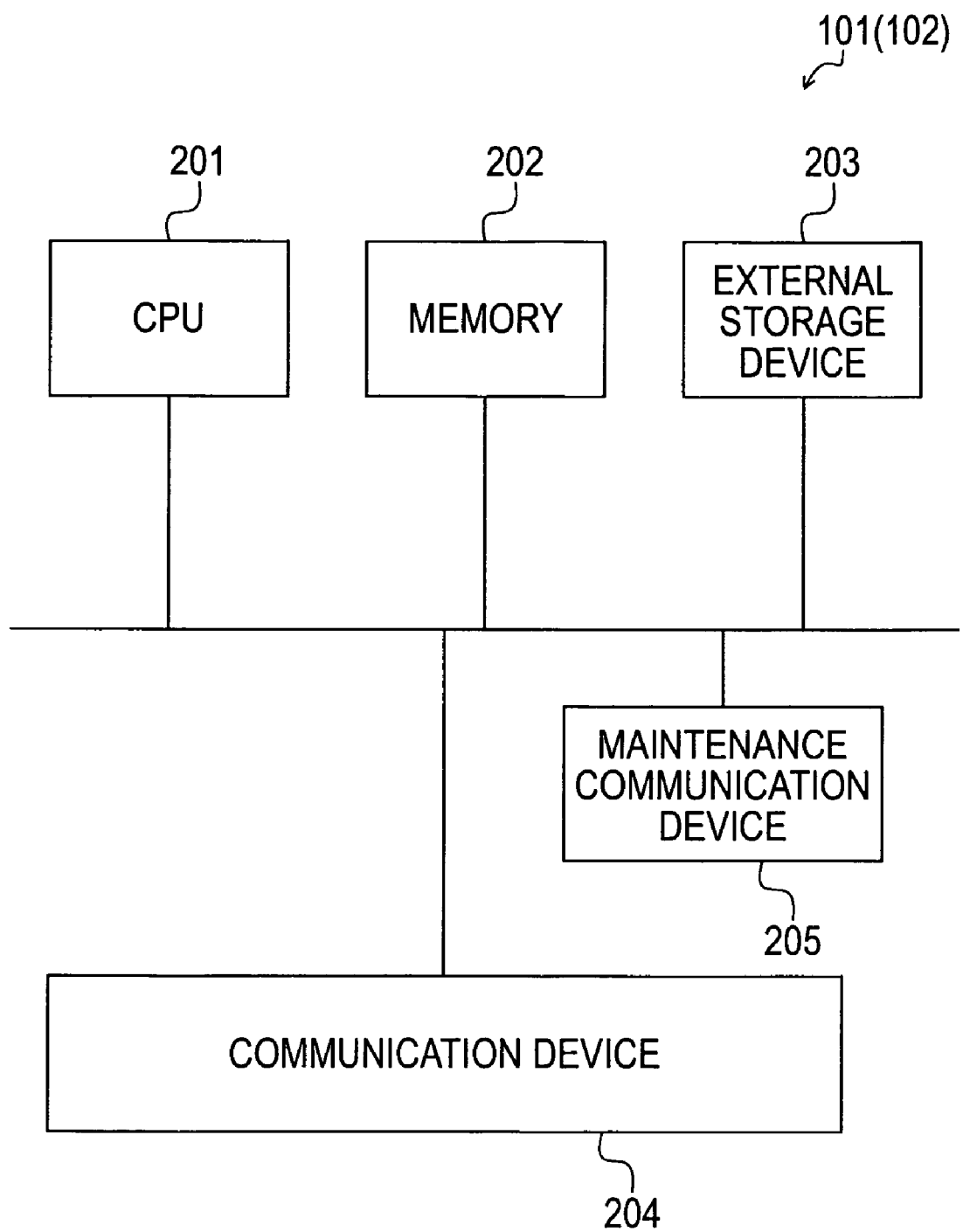
FIG. 2 is a block diagram schematically showing a structure of hardware of a server according to the embodiment of the present invention.

FIG. 2 is a block diagram schematically showing the structures of the hardware of the servers 101 and 102. As described above, the hardware structures of the servers 101 and 102 are the same. As shown in FIG. 2, these servers have a CPU (Central Processing Unit) 201, a memory 202, an external storage device 203, a communication device 204, and a maintenance communication device 205.

The CPU 201 may execute software (refer to FIG. 3) to be described later and may control the entire server. The CPU 201 may execute a softswitch that is configured by the object-oriented program, namely, application software for operating the computer as the VoIP-PBX. In addition, the CPU 201 may check the occurrence of the failure in the server.

The memory 202 can be configured by using, for example, a semiconductor memory device such as a ROM (Read Only Memory), a RAM (Random Access Memory), and/or a flush memory. A program and the data that are static, namely, unrewritable are stored in the ROM. The RAM is used, for example, as an working memory. The flush memory is used, for example, for saving the no-static data.

The external storage device 203 is, for example, a hard disk. The external storage device 203 may save an operating system, application software, and a middle ware for realizing the functions to be described later (refer to FIG. 3) or the like.

The communication device 204 may make the communication with an IP telephone set accommodated in the VoIP-PBX, namely, in the redundant system 100, the communication for establishing the call connection, and the voice communication with the other VoIP-PBX or the like.

The maintenance communication device 205 may communicate with the other server belonging to the same redundant system. The maintenance communication device 205 is used, for example, for transmitting and receiving the information between the servers for changing the state between active and standby when the failure occurs.

Figure 3:
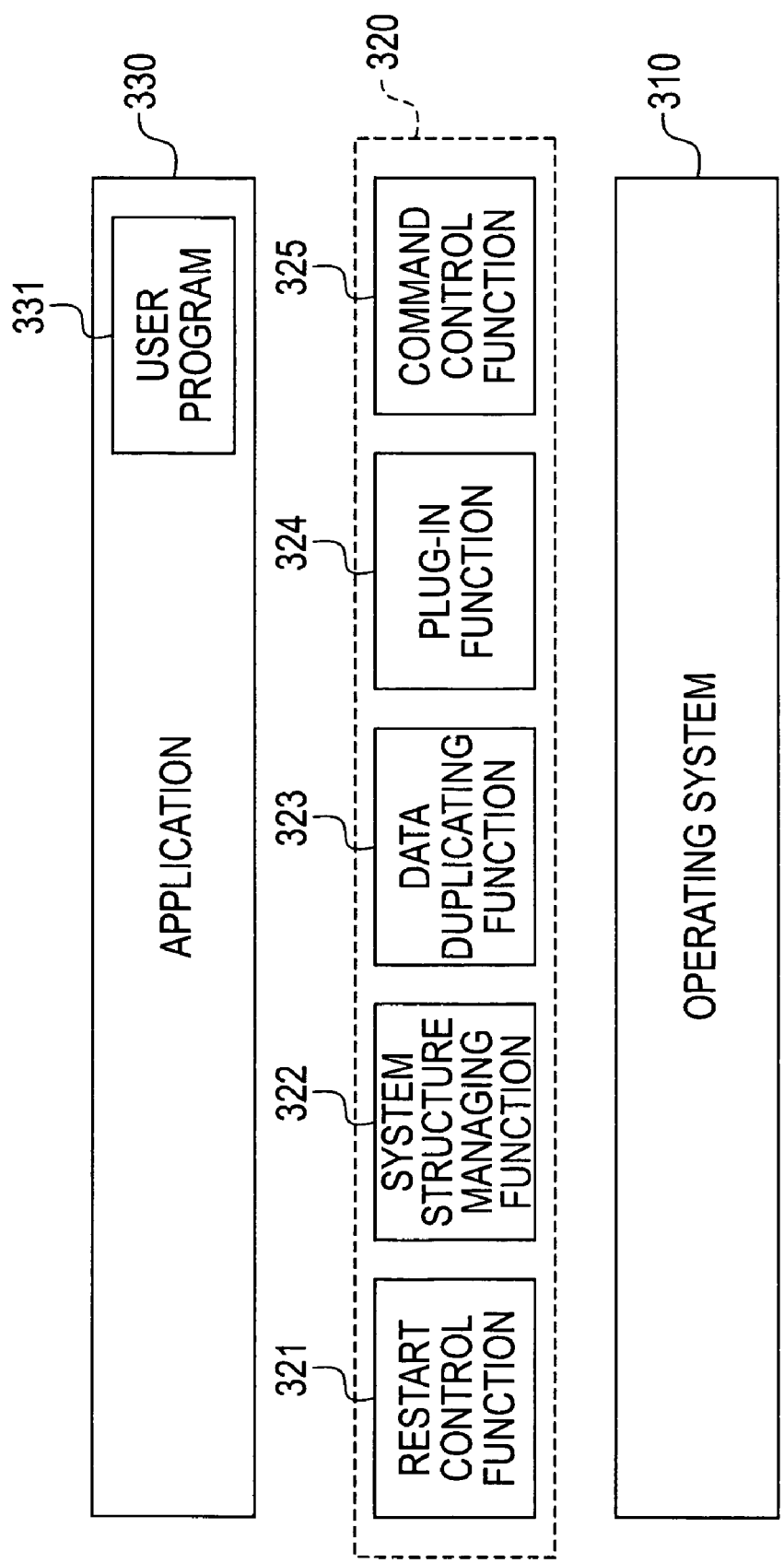
FIG. 3 is a conceptual view showing a structure of software that is constructed by a server according to the embodiment of the present invention.

FIG. 3 is a conceptual view showing a structure of software that is constructed in the servers 101 and 102. The structures of the software of the servers 101 and 102 are the same. As shown in FIG. 3, the servers 101 and 102 may include an operating system 310, a common platform 320 as a middle ware, and an application 330.

The operating system 310 may manage the entire server and may operate the common platform 320 and the application 330.

The common platform 320 may include a restart control function 321, a system structure managing function 322, a data duplicating function 323, a plug-in function 324, and a command control function 325. The details of the functions 321 to 325 will be described later. The common platform 320 is described in the object-oriented language.

The application 330 may include a user program 331 for carrying out a call processing service. The user program 331 may carry out a user process. The application 330 may carry out the processing by using the functions provided from the functions 321 to 325 of the common platform 320. For the communication between the common platform 320 and the user process, a language function call or a function address call is used. In other words, the common platform and the user process do not execute the communication using a socket and a semaphore. Therefore, for the communication between the user process and the process in the common platform, a library of an access function is used. The library of the access function is disposed in the common plat form, and the user process has links to this library so as to realize the communication.

Hereinafter, the details of the functions 321 to 325 will be described. These functions are realized by the object.

The restart control function 321 may control restart of the system. When the entire system is restarted, the restart control function 321 may initialize the entire system according to the predetermined restart phase. Incase only processes where failures occur are restarted, the restart control function 321 performs initializing of the reactivated processes, monitoring of the other process and so on. In addition, the restart control function 321 manages threads which are initialized. A cause of restart of the system are roughly divided into an external cause and an internal cause. The external cause IS, for example, execution of a restart command, the instruction by the user, or the like. The internal cause is, for example, execution of the autonomous restart processing when the abnormalities of the hardware or the software are detected. When the server is put in the active state, the restart control function 321 may autonomously perform the restart control. When the server is put in the standby state, the restart control function 321 may perform the restart control in case the occurrence of the failure is notified from the system structure managing function 322. The restart control function 321 may command the system structure managing function 322 to changing active and standby of the server when the restart processing of the active server is performed.

The system structure managing function 322 may manage the duplicated structure between the active server and the standby server. In other words, the system structure managing function 322 may carry out setting and changing of active and standby of respective servers 101 and 102. The system structure managing function 322 of the standby server may produce a virtual ARP (Address Resolution Protocol) table when the server is changed into active. The APR table is a table for transforming IP (Internet protocol) addresses and MAC (Media Access Control) addresses. An interface of the server uses a virtual IP address and a virtual MAC address, but not the original IP address and the original MAC address. Thereby, even if a relay device (for example, a router) connected to the communication device 204 (refer to FIG. 2) cannot immediately rewrite the ARP table, it is possible to make the communication with certainty. The system structure managing function 322 of the standby server monitors the operation of the active server by using the virtual IP address and the virtual MAC address. Further, when the abnormality of the active server is detected, the system structure managing function 322 of the standby server may notify the occurrence of the abnormality to the restart control function 321 of the standby server.

The data duplicating function 323 may synchronize the data and the instance or the like stored in the memories of the servers 101 and 102. The "synchronization" is the processing to conform the data or the like of the server 101 to the data or the like of the server 102. The details of the synchronization processing will be described later by using FIG. 4.

The plug-in function 324 is a function for updating an execution program without stopping the system. A adjustment to a bug of the system, a simple functional change, and a simple functional addition or the like is carried out by using the plug-in function 324. According to the present embodiment, the program is upgraded in functions as a general rule.

The command control function 325 is a function to link a GUI (Graphical User Interface) command provided by an administrator of the redundant server system 100 and a process for performing the actual processing.

Figure 4:
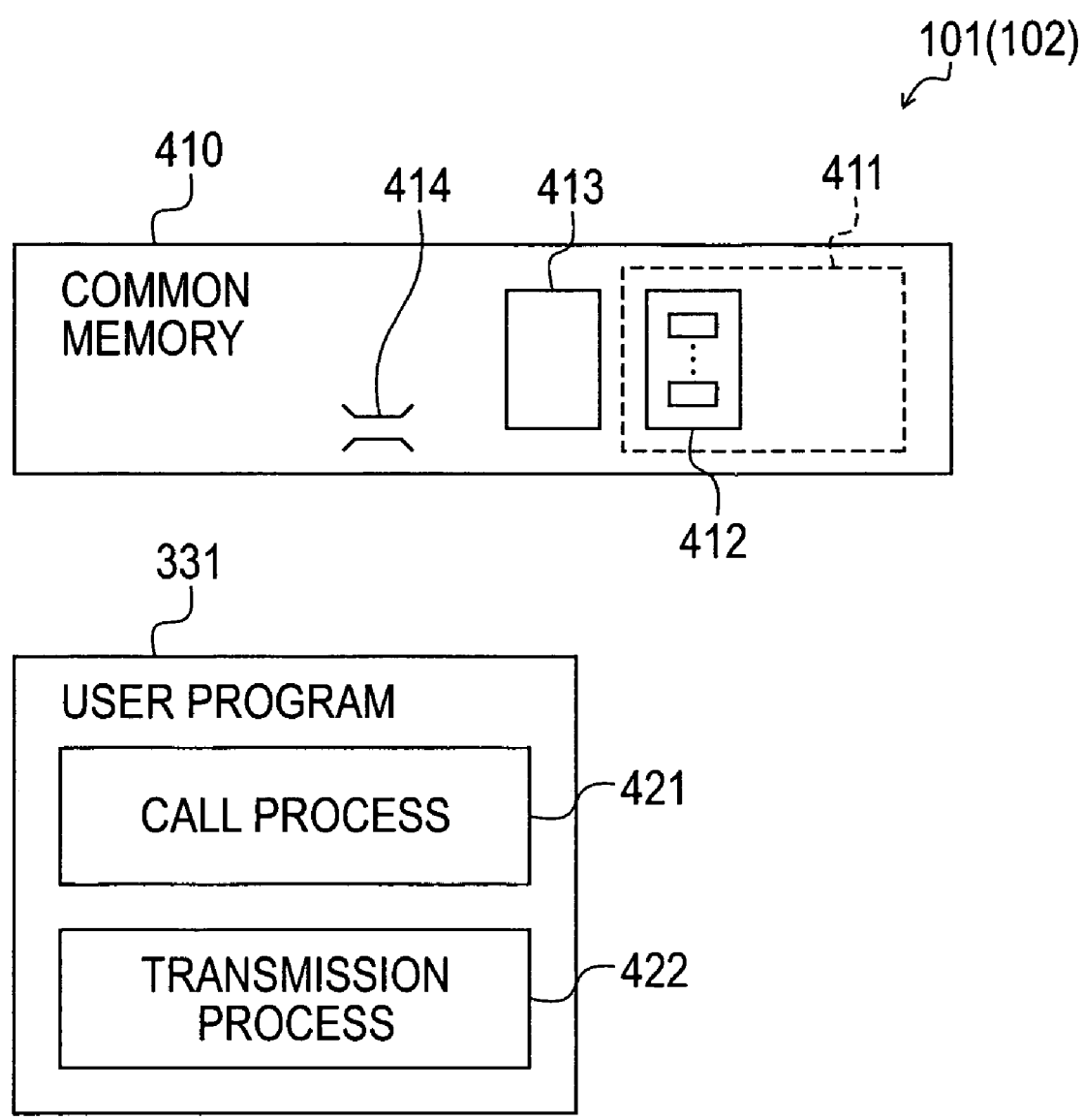
FIG. 4 is a conceptual view illustrating a synchronization technology according to the embodiment of the present invention.

FIG. 4 is a conceptual view for explaining the synchronization technology according to the present embodiment.

According to the present embodiment, the data or the like 412 to be synchronized is stored in a synchronization memory area 411 located in the common memory 410 of the servers 101 and 102, and the synchronization memory area 411 is managed by an instance management object 560 (to be described later). The user program 420 may carry out a transmission process 422 independently from a call process 421. In order to link the call process 421 with the transmission process 422, the common memory 410 is provided with a management bit map table 413 and a synchronization requirement queue 414. The management bit map table 413 is provided with a flag corresponding to each segment of the synchronization memory area. Each segment is a virtual one and the size of each segment is not static. The call process 421 sets a flag corresponding to the segment that writing or rewriting is made when the data is written or rewritten in the synchronization memory area and stores the information indicating a head address and the size of the segment in the synchronization requirement queue 414. The transmission process 422 checks the flag at a predetermined timing and reads the information stored in the synchronization requirement queue 414 when there is the set flag. Further, the transmission process 422 reads out the data of the segment corresponding to the read information from the synchronization requirement queue 414 and transmits it to the other server. According to the synchronization technology of the present embodiment, the call process 421 and the transmission process 422 are independently carried out, so that even if the failure occurs in the call process 421, it is possible to carry out the transmission process 422. Therefore, the servers 101 and 102 are synchronized with a high reliability.

Figure 5:
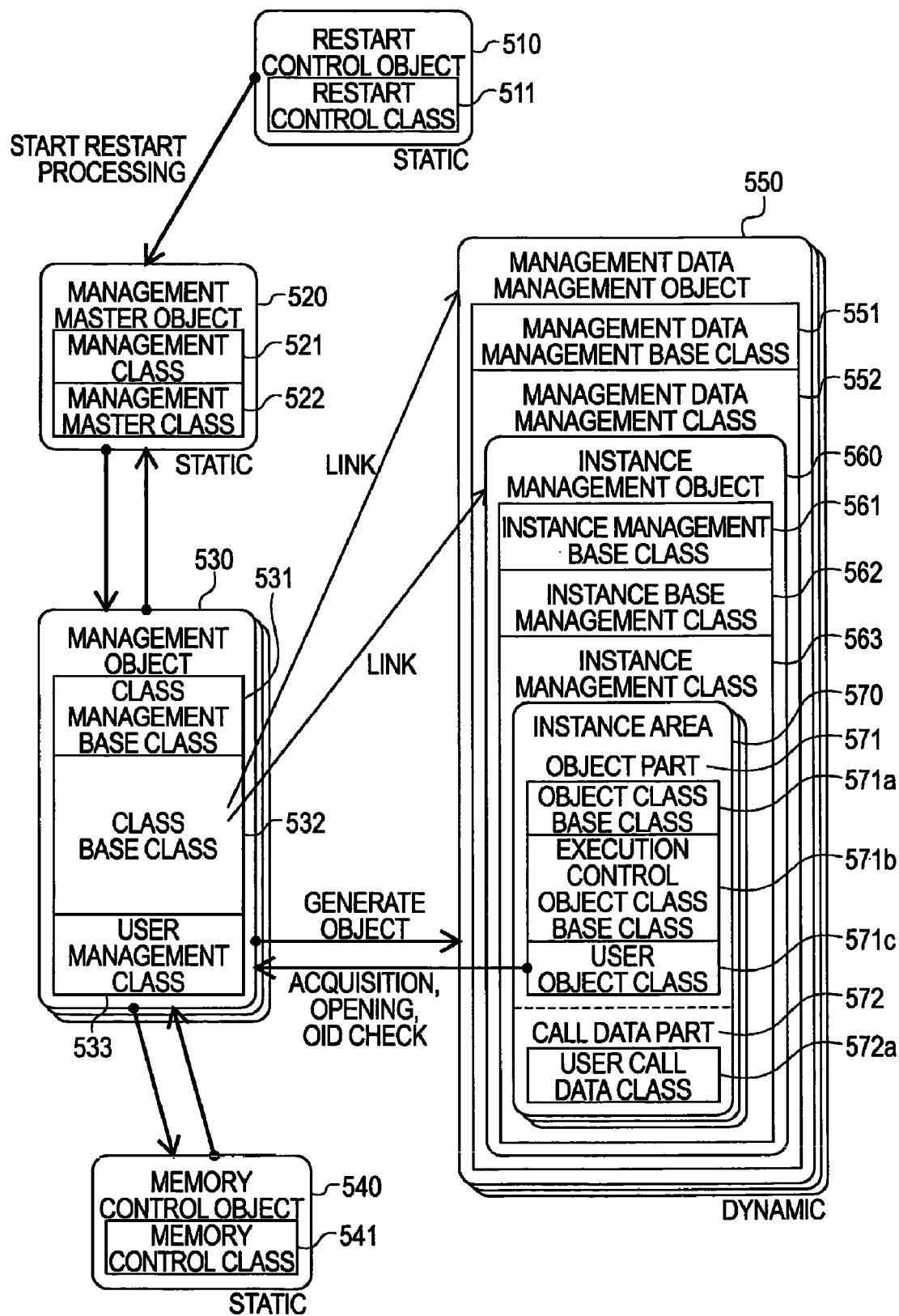
FIG. 5 is a conceptual view showing an object model according to the embodiment of the present invention.

FIG. 5 is a conceptual view showing an object model in the servers 101 and 102.

A restart control object 510 corresponds to the above-described restart control function 321. The restart control class 511 is a class for executing a restart control object 510.

A management master object 520 may control the order of start-up of a plurality of management objects, and may manage a subservient relationship between the object and the management, by using a class number and a management ID. The management master object 520 is generated by a class number and a management ID management class 521, and a management master class 522. The class number and the management ID management class 521 is a class for managing the class number and the management ID. The management master class 522 may control the order of start-up of the management and may manage the subservient relationship between the object and the management.

A management object 530 makes a management data management object 550 to generate a user object. Further, the management object 530 may perform acquisition and opening and oid check of the user object. The acquisition means the operation to take over the user object from an instance management object 560 to the management object 530. The taken over object is put in the using state. The opening means the operation to return the object to the instance management object 560 when the user object in use is put in the no-using state. The oid check means the operation to check whether the oid (the object ID) held by the other user object is managed in the instance management object 560 or not, and whether this oid is in use or not. The management object 530 is generated by a management class management base class 531, a management class base class 532, and a user management class 533.

A memory control object 540 may manage a memory area to be allocated to a management data management object 550 (to be described later). In case of the management data management object 550 holding the user object as the rescue target, the memory control object 540 may allocate the synchronization memory area 411 in the common memory 410. The memory control object 540 is generated by a memory control class 541.

The management data management object 550 may manage the data used for managing the user program 331. The management data management object 550 is generated by a management data management base class 551 and a management data management class 552. The management data management base class 551 is the lowest class of a class ranks of the object 550 and includes a common function or the like. A management data management class 552 is a class for substantializing the object 550 and it holds the instance management object 560 as a data member.

The instance management object 560 may manage an instance area 570 of the user object. The instance management object 560 is generated by an instance management base class 561, an instance base management class 562, and an instance management class 563. The instance management base class 561 is a class for managing occupation and vacancy of the user object and securing an area. The instance base management class 562 is a class for managing the using state of the instance area. The instance management class 563 is a class for managing the area of the user object by arranging and holding the instance area class in the data member.

An instance area object 570 is a actual instance area. The instance area object 570 includes an object part 571 and a call data part 572.

The object part 571 includes an object class base class 571a, an execution control object class base class 571b, and a user object class 571c. The object class base class 571a is a common interface to be linked with the management master 520 and the management object 530. The execution control object class base class 571b is a base class for generating a user object. The user object class 571c is a class for generating a user object.

The call data part 572 may include a user call data class 572a. The user call data class 572a is defined as a data class for each user when managing the data other than by the data member of the user object class 571c. The class 572a is used when a succession relation with the user object class 571c and the succession relation of the data managed by the class 571c do not coincide with each other.

The object to carry out the calling processing of the present embodiment is generated on the basis of the user object class 571c. Then, an instrument class object statically existing, the instance management class 563, and the base classes 571a and 571b of the instance area object 570 may manage each calling processing object by being linked to each other.

An occurrence of the failure is detected by the restart control function 321 (refer to FIG. 3). The restart control function 321 may activate the restart control object 510. The restart control object 510 notifies the management master object 520 of start of the restart processing. The management master object 520 call the management object 530 about the restart processing when receiving the notice from the restart control object 510. Then, the management object 530 may perform the restart processing to be described later.

Figure 6:
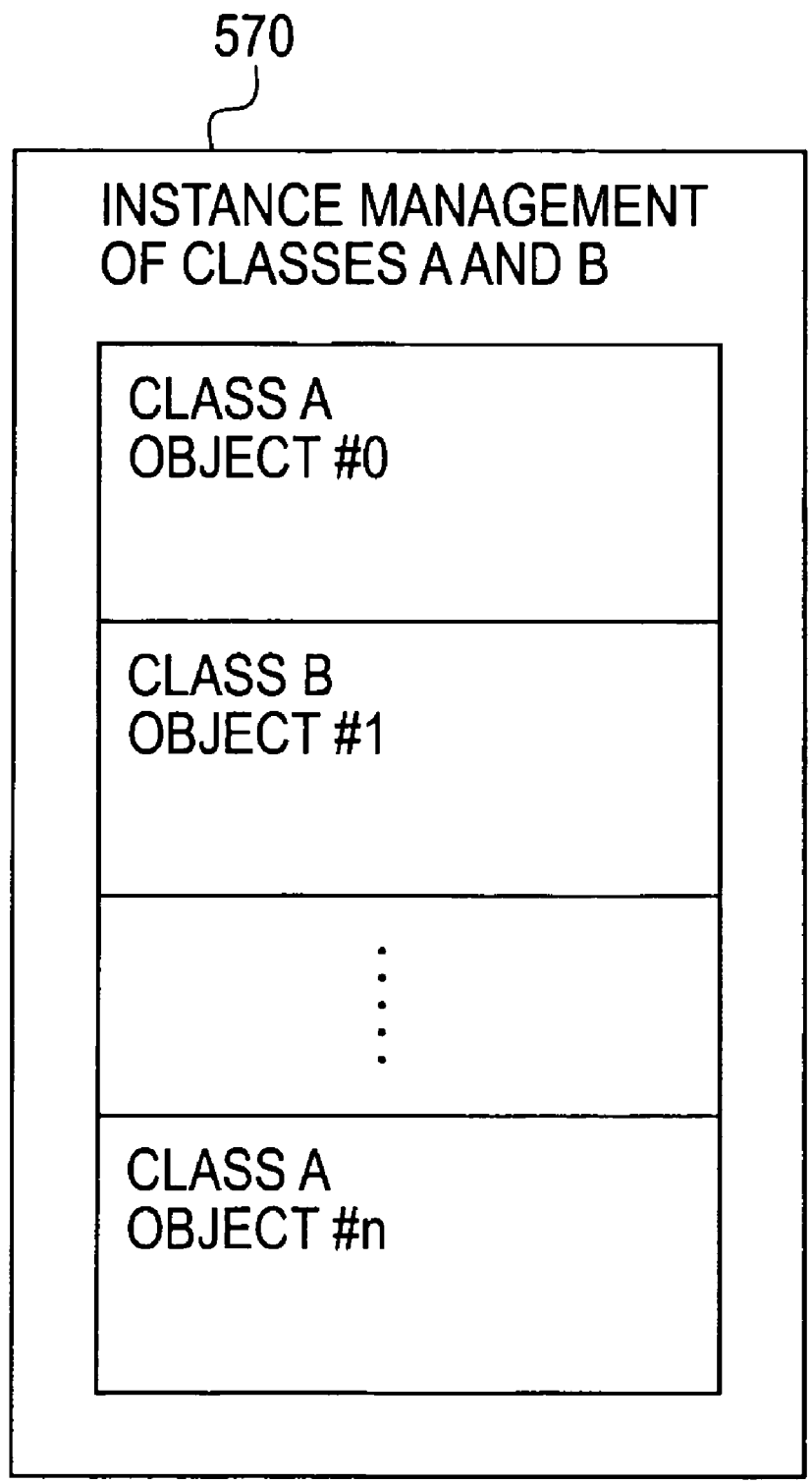
FIG. 6 is a conceptual view illustrating the instance management according to the embodiment of the present invention.

FIG. 6 is a conceptual view for explaining the instance management object 560.

In order to carry out one calling processing service, a plurality of objects is needed. In this example, the number of objects to be used for one calling processing service is defined as "n+1".

According to this example, classes A and B corresponding to two kinds of calling processing services are carried out and the classes A and B uses n+1 objects #0 to #n in total.

In the object-oriented program, the different classes can call the same object. Accordingly, conventionally, the class B may call the instance stored in the memory as the object of the class A and on the contrary, the class A may call the instance stored in the memory as the object of the class B.

In contrast, according to the present embodiment, as shown in FIG. 6, the instance corresponding to the object called by the class A and the instance corresponding to the object called by the class B are separately stored in the synchronization memory area 411 in a predetermined order. As a result, it is possible to speed up the processing of the call processing service. In addition, when a new calling processing service is generated, by aligning the instance used for the processing in one memory area 411, the instance management object 560 can take out the necessary object from the memory area 411 and takes it over to the call processing service. Further, the instance management object 560 also can pool the object that becomes not used by the calling processing object.

According to the present embodiment, since the instance is stored in the synchronization memory area 411 of the common memory 410, it is possible to synchronize the instances stored in the servers 101 and 102. In addition, as described above, the call process 421 and the transmission process 422 are independently carried, so that, even if the failure occurs in the call process 421, the transmission process 422 can be carried out. Therefore, the instances stored in the synchronization memory area 411 in the servers 101 and 102 are synchronized with a high reliability.

The synchronization memory area 411 can be provided in a memory other than the common memory 410 if it is a memory that cannot be erased even if the process is reactivated.

As described above, the instance management object 560 selects a generated class and gives it over to the management object 530 upon the acquisition request therefrom. The instance data management object 560 can give over the classes of the same memory area to the management object 530 upon a plurality of acquisition requests.

Figure 7:
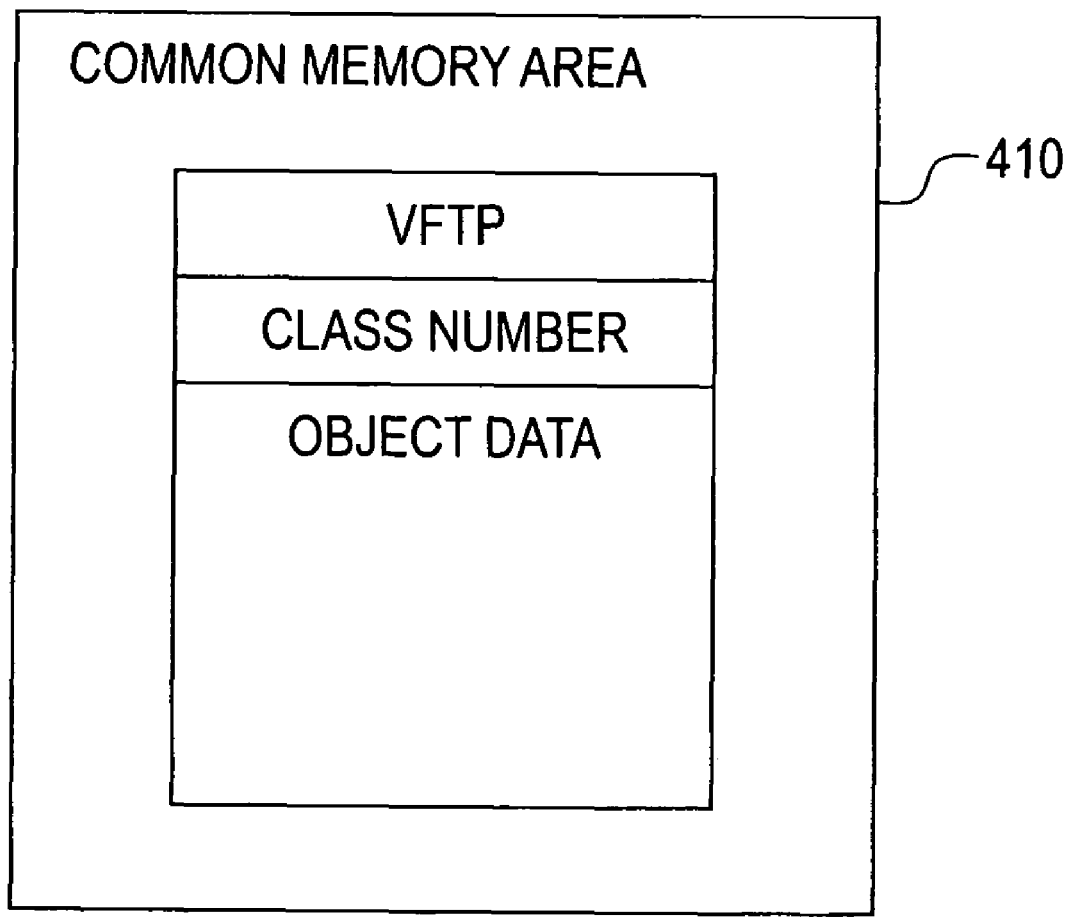
FIG. 7 is a conceptual view showing a structure of a service object according to the embodiment of the present invention.

FIG. 7 is a conceptual view showing a structure of an object for a calling processing service shown in FIG. 6.

As shown in FIG. 7, the object may include a virtual function table pointer (VFTP), a class number, and the object data.

The VFTP is a pointer for discriminating a virtual function class corresponding to the class of this object.

The class number is the information for discriminating the class. As the class number, for example, an object logic ID (LID) can be used. The LID may include the class number and the instance number. The class number is added when the class for generating the object is selected.

The conventional object for the call processing service only includes the VFTP and the object data, but does not include the class number. On the contrary, the object for the call processing service according to the present embodiment has the class number, so that the relief of object for the call processing service (namely, the synchronization of instance corresponding to the object between the server 101 and the server 102) is made to be possible.

A reason why the system according to the present embodiment can rescue the object for the call processing service will be described with reference to the conceptual view of FIG. 8.

Figure 8:
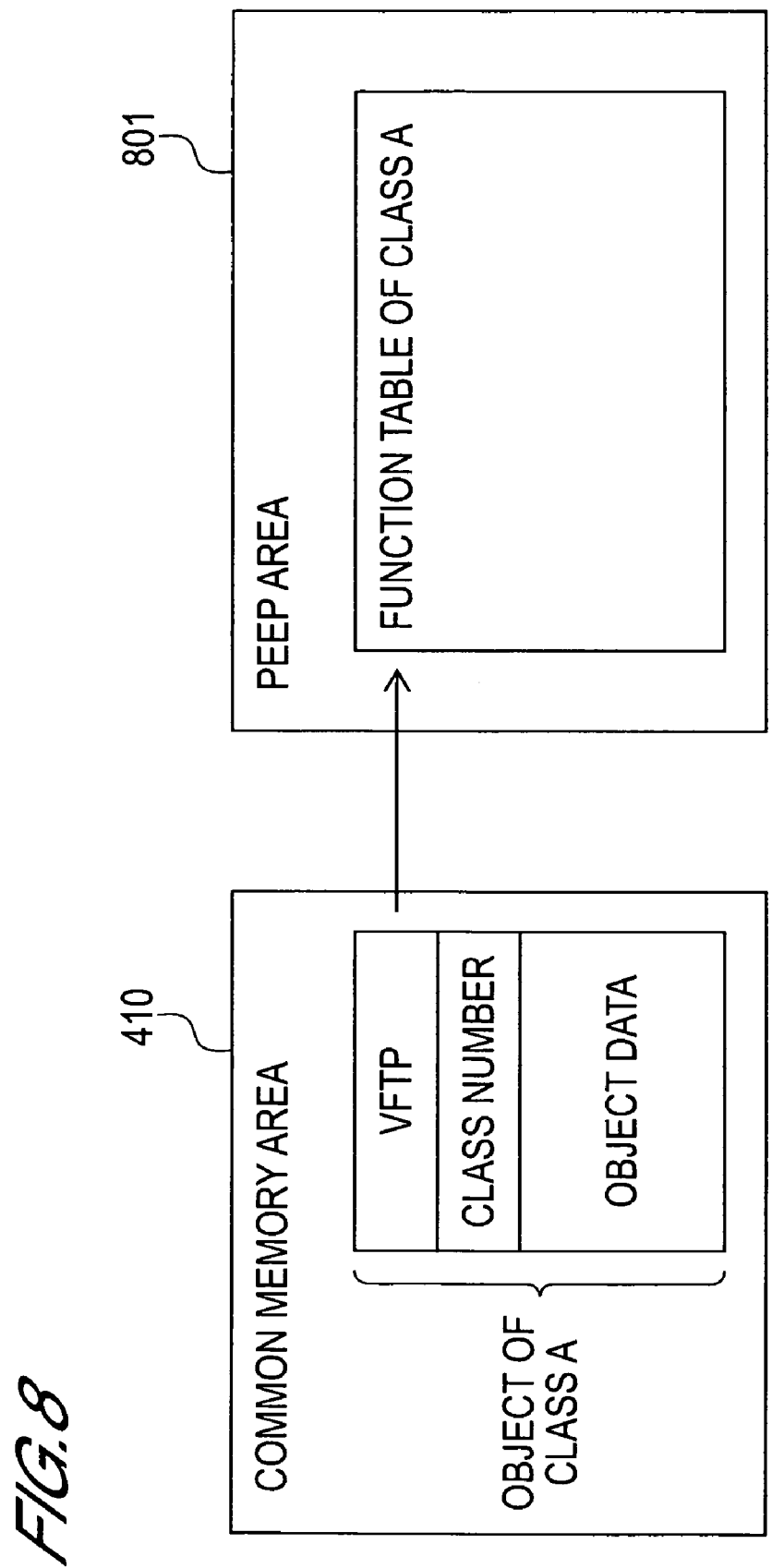
FIG. 8 is a conceptual view illustrating a method for rescuing an object according to the embodiment of the present invention.

As shown in FIG. 8, every time the call process is newly generated, a virtual function table is stored in the memory area (in the example of FIG. 8, a peep area 801). Then, by setting the VFTP, the object and the virtual function table are linked to each other. When the object is operated, by using the link, the virtual function table is read out.

As described above, when the failure occurs in the active server, the other server is changed into active. The new active server may reproduce the call process by using the instance stored in the synchronization memory area 411. In this case, the memory area having the virtual function table stored therein is appropriately decided when the call process is generated. Accordingly, when the call process is reproduced, there is no guarantee that the virtual function table is stored in the same area as the previous reproduction of the call process. In many cases, the virtual function table is stored in the different area from the previous reproduction of the call process. On the other hand, since the object is stored in the synchronization memory area 411, the object holds the VFTP of previous value as it is. Therefore, when the call process is reproduced, it is not possible to specify the relation between the object and the virtual function table. As a result, it is necessary to set the VFIP again when the process is reproduced.

However, the servers 101 and 102 of the present embodiment cannot specify the class of the object corresponding to the instance from the memory area where this instance is stored because a plurality of classes is allocated to one memory area (refer to FIG. 6).

To solve this problem, the object of the present embodiment includes the class number. The object according to the present embodiment can specify the class by using the class number, so that the VFTP can be set again.

In this way, according to the present embodiment, the object for the calling processing service is rescued.

What is claimed is:

1. A redundant VoIP (Voice over IP) system using an object-oriented program, wherein the system has a plurality of devices, one device is in the active state and the other devices are in the standby state, each of the devices comprising:
    a synchronization memory which stores one or more instances of objects which correspond to a plurality of classes, according to the order of the processing, and is not erased when a process to be carried out by the object is reproduced, wherein each instance includes:
        a virtual function discrimination information which is used for discriminating a function memory area located in a memory area, wherein in the function memory area a function memory corresponding to the class of the object which stores plural kinds of virtual functions generated for each process is stored;
        a class information which is used for discriminating a class corresponding to the object; and
        an object data which is used for processing the object;
    the function memory which is stored in a new function memory area differing from the previous reproduction of the process in the memory area, when a failure occurs in the device in the active state;
    an application program which reads the instance from the synchronization memory in the device in the active state and writes it to the synchronization memory of the device in the standby state; and
        an instance management class which, when a device newly put in the active state reproduces a process of an object by using the instance stored in the synchronization memory of this device, discriminates the class corresponding to the object by using the class information included in this instance, and sets again the virtual function discrimination information which discriminates the new function memory area to this instance.

2. The redundant system according to claim 1, wherein each of the devices is a server in which a VoIP softswitch is installed.

3. The redundant system according to claim 2, wherein the process is a call process.

4. The redundant system according to claim 1, wherein the function memory and the synchronization memory are memory areas which are located in a same memory device.

5. The redundant system according to claim 1, wherein the application program carries out synchronization of the synchronization memory and execution of the process of the object independently from each other.

6. The redundant system according to claim 1, further comprising:
    a management bit map table which has a flag that is provided for each segment of a synchronization data memory located in the device in the active state; and
    a synchronization requirement queue which stores a synchronization information including a head address and a size of a segment.

7. The redundant system according to claim 6, wherein the application program comprises:
    a call process which carries out the service by using one or plural segments and sets a flag corresponding to the segment every time the application program carries out writing or rewriting of the segment; and
    a transmission process which checks each flag in a management bit map table at a predetermined timing, and when the set flag exists, reads out the synchronization data from the segment corresponding to the synchronization information stored in the synchronization requirement queue, and resets the flag, independently from the call process.

8. A method for rescuing a redundant VoIP (Voice over IP) system using an object-oriented program, wherein an active device of the redundant system carries out the steps of:
    storing an instance of an object, which corresponds to one of a plurality of classes according to the order of the processing, in a synchronization memory which is not erased when a process to be carried out by the object is reproduced, wherein the instance includes:
        a virtual function discrimination information which is used for discriminating a function memory area located in a memory area, wherein in the function memory area a function memory corresponding to the class of the object which stores plural kinds of virtual functions generated for each process is stored;
        a class information which is used for discriminating a class corresponding to the object; and
        an object data which is used for processing the object;
    storing the function memory, which is stored in a new function memory area differing from the previous reproduction of the process in the memory area, when a failure occurs;
    reading the instance from the synchronization memory and writing it to a synchronization memory of the standby device in the standby state when the failure occurs; and
        discriminating the class corresponding to the object using the class information included in the instance and setting again the virtual function discrimination information of this object, which discriminates the new function memory area to this instance when the device newly put in the active state reproduces the process of an object by using the instance stored in the synchronization memory of this device.

9. The method for rescuing the redundant system according to claim 8, wherein the device is a server in which a VoIP softswitch is installed.

10. The method for rescuing the redundant system according to claim 9, wherein the process is a call process.

11. The method for rescuing the redundant system according to claim 8, wherein the function memory and the synchronization memory are memory areas which are located in a same memory device.

12. The method for rescuing the redundant system according to claim 8, wherein synchronization of the synchronization memory and execution of the process by the object are carried out independently to each other.

13. The method for rescuing the redundant system according to claim 8, further comprising the steps of:
    producing a management bit map table having a flag that is provided for each segment of a synchronization data memory in an active server; and
    producing a synchronization requirement queue for storing a synchronization information that includes a head address and a size of a segment.

14. The method for rescuing the redundant system according to claim 13, wherein the reading step comprises:
    a call process which carries out the service by using one or plural segments and sets a flag corresponding to the segment every time the application program carries out writing or rewriting of the segment; and a transmission process which checks each flag in a management bit map table at a predetermined timing, and when the set flag exists, reads out the synchronization data from the segment corresponding to the synchronization information stored in the synchronization requirement queue, and resets the flag, independently from the call process.

15. The redundant system according to claim 1, further comprising:
a common memory of the devices in which the synchronization memory is located;
a management bit map table which has a flag that is provided for each segment of a synchronization data memory located in the common memory; and
a synchronization requirement queue which stores a synchronization information including a head address and a size of a segment;
wherein the common memory is provided with the management bit map and the synchronization requirement queue.

16. The method for rescuing the redundant system according to claim 8, further comprising the steps of:
producing a management bit map table having a flag that is provided for each segment of a synchronization data memory in an active sewer; and
producing a synchronization requirement queue for storing a synchronization information that includes a head address and a size of a segment,
wherein a common memory of the devices in which the synchronization memory is located is provided with the management bit map and the synchronization requirement queue.

17. The redundant system according to claim 1,
wherein
the devices include a system structure managing means and a restart control means,
the system structure managing means of the device in the standby state monitors the operation of the device in the active state, notifies the occurrence of the abnormality to the restart control means of the device in the standby state, and lets an interface of the device make the communication using the virtual IP address and the virtual MAC address,
the restart control means of the device in the standby state perform the restart control in case the occurrence of the failure is notified from the system structure managing means.

18. The redundant system according to claim 1,
wherein the device further comprises:
a communication device for making the communication with an IP telephone set accommodated in the redundant system, the communication for establishing the call connection, or the voice communication with the other VoIP-PBX,
a maintenance communication device for transmitting and receiving the information between the devices for changing the state between active and standby when the failure occurs.

19. The redundant system according to claim 1, wherein the device in the active state makes the communication using a virtual IP address and a virtual MAC address,
at least one of the devices in the standby state monitors the operation of the device in the active state by using the virtual IP address and the virtual MAC address, and
the device in the standby state takes over the data and the object from the device in the active state using the virtual IP address and the virtual MAC address when the abnormality of the device in the active state is detected.

20. The redundant system according to claim 1, wherein the function memory is a virtual function table.

21. The redundant system according to claim 1, wherein the virtual function discrimination information is a virtual function table pointer for discriminating the virtual function table corresponding the class of the object.

22. The redundant system according to claim 1, wherein the class information is an object logic ID including a class number and an instance number.

23. A method for rescuing a redundant system according to claim 8, wherein the device in the active state makes the communication using a virtual IP address and a virtual MAC address,
at least one of the devices in the standby state monitors the operation of the device in the active state by using the virtual IP address and the virtual MAC address, and
the device in the standby state takes over the data and the object from the device in the active state using the virtual IP address and the virtual MAC address when the abnormality of the device in the active state is detected.

24. The method for rescuing a redundant system according to claim 8, wherein the function memory is a virtual function table.

25. The method for rescuing a redundant system according to claim 8, wherein the virtual function discrimination information is a virtual function table pointer for discriminating the virtual function table corresponding the class of the object.

26. The method for rescuing a redundant system according to claim 8, wherein the class information is an object logic ID including a class number and an instance number.

* * * * *